(12) United States Patent
Frank et al.

(10) Patent No.: US 8,897,812 B2
(45) Date of Patent: *Nov. 25, 2014

(54) AUTONOMOUS MUTING INDICATION TO ENABLE IMPROVED TIME DIFFERENCE OF ARRIVAL MEASUREMENTS

(71) Applicant: Motorola Mobility LLC, Libertyville, IL (US)

(72) Inventors: Colin Frank, Park Ridge, IL (US); Sandeep Krishnamurthy, Arlington Heights, IL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/759,089

(22) Filed: Feb. 5, 2013

(65) Prior Publication Data
US 2013/0150092 A1 Jun. 13, 2013

Related U.S. Application Data

(63) Continuation of application No. 12/573,456, filed on Oct. 5, 2009, now Pat. No. 8,374,633.

(51) Int. Cl.
*H04W 24/00* (2009.01)
*H04W 4/02* (2009.01)
*G01S 5/06* (2006.01)
*H04W 64/00* (2009.01)
*G01S 5/02* (2010.01)

(52) U.S. Cl.
CPC ............ *H04W 4/023* (2013.01); *G01S 5/06* (2013.01); *H04W 64/00* (2013.01); *G01S 5/0215* (2013.01)

USPC ............ 455/456.4; 455/456.1; 455/456.2; 455/456.3; 455/414.1

(58) Field of Classification Search
USPC .............. 455/456.1, 456.2, 456.3, 456.4; 370/329, 311, 450, 445
See application file for complete search history.

(56) References Cited

U.S. PATENT DOCUMENTS

| 4,631,543 A | 12/1986 | Brodeur |
| 7,639,660 B2 | 12/2009 | Kim et al. |

(Continued)

FOREIGN PATENT DOCUMENTS

| WO | 9921389 A1 | 4/1999 |
| WO | 2007052115 A2 | 5/2007 |

(Continued)

OTHER PUBLICATIONS

3GPP TSG RAN WG1 #59bis, Jan. 18-22, 2009, Jeju, Valencia, Spain, Change Request "Clarification of the CP length of empty OFDM symbols in PRS subframes", Ericsson, ST-Ericsson, Motorola, Qualcomm Inc., R1-100311; 2 pages.

(Continued)

*Primary Examiner* — Kathy Wang-Hurst
(74) *Attorney, Agent, or Firm* — Lerner, David, Littenberg, Krumholz & Mentlik, LLP

(57) ABSTRACT

A method, a user communication device, and a base station are disclosed. A transceiver 302 may receive a serving transmission from a serving base station. A processor 304 may make a status determination of an autonomous muting status of a neighbor base station based on the serving transmission.

2 Claims, 9 Drawing Sheets

(56) References Cited

U.S. PATENT DOCUMENTS

| | | | |
|---|---|---|---|
| 7,940,740 | B2 | 5/2011 | Krishnamurthy et al. |
| 2001/0034238 | A1 | 10/2001 | Voyer |
| 2003/0222819 | A1 | 12/2003 | Karr et al. |
| 2005/0035824 | A1 | 2/2005 | Kearns |
| 2005/0134456 | A1 | 6/2005 | Niu et al. |
| 2005/0135324 | A1 | 6/2005 | Kim et al. |
| 2006/0019677 | A1 | 1/2006 | Teague et al. |
| 2006/0181453 | A1 | 8/2006 | King et al. |
| 2006/0209754 | A1 | 9/2006 | Ji et al. |
| 2006/0256887 | A1 | 11/2006 | Kwon et al. |
| 2006/0281423 | A1 | 12/2006 | Caimi et al. |
| 2006/0291393 | A1 | 12/2006 | Teague et al. |
| 2007/0008108 | A1 | 1/2007 | Schurig et al. |
| 2007/0049280 | A1 | 3/2007 | Sambhwani et al. |
| 2007/0133462 | A1 | 6/2007 | Guey |
| 2007/0153743 | A1 | 7/2007 | Mukkavilli et al. |
| 2007/0211657 | A1 | 9/2007 | McBeath et al. |
| 2007/0223422 | A1 | 9/2007 | Kim et al. |
| 2007/0280160 | A1 | 12/2007 | Kim et al. |
| 2008/0002735 | A1* | 1/2008 | Poirier et al. ............ 370/445 |
| 2008/0014960 | A1 | 1/2008 | Chou |
| 2008/0089312 | A1 | 4/2008 | Malladi |
| 2008/0095109 | A1 | 4/2008 | Malladi et al. |
| 2008/0130626 | A1 | 6/2008 | Ventola et al. |
| 2008/0132247 | A1 | 6/2008 | Anderson |
| 2008/0133462 | A1 | 6/2008 | Aylward et al. |
| 2008/0159239 | A1 | 7/2008 | Odiyzko et al. |
| 2008/0167040 | A1 | 7/2008 | Khandekar et al. |
| 2008/0170602 | A1 | 7/2008 | Guey |
| 2008/0170608 | A1 | 7/2008 | Guey |
| 2008/0212520 | A1 | 9/2008 | Chen et al. |
| 2008/0232395 | A1 | 9/2008 | Buckley et al. |
| 2008/0267310 | A1 | 10/2008 | Khan et al. |
| 2008/0274753 | A1 | 11/2008 | Attar et al. |
| 2008/0307427 | A1 | 12/2008 | Pi et al. |
| 2009/0041151 | A1 | 2/2009 | Khan et al. |
| 2009/0061887 | A1 | 3/2009 | Hart et al. |
| 2009/0122758 | A1 | 5/2009 | Smith et al. |
| 2009/0228598 | A1 | 9/2009 | Stamoulis et al. |
| 2009/0238131 | A1 | 9/2009 | Montojo et al. |
| 2009/0252077 | A1 | 10/2009 | Khandekar et al. |
| 2009/0262699 | A1 | 10/2009 | Wengerter et al. |
| 2009/0268675 | A1 | 10/2009 | Choi |
| 2009/0270103 | A1 | 10/2009 | Pani et al. |
| 2009/0285135 | A1 | 11/2009 | Rousu et al. |
| 2009/0285321 | A1 | 11/2009 | Schulz et al. |
| 2010/0046460 | A1 | 2/2010 | Kwak et al. |
| 2010/0056166 | A1 | 3/2010 | Tenny |
| 2010/0103949 | A1 | 4/2010 | Jung et al. |
| 2010/0118706 | A1 | 5/2010 | Parkvall et al. |
| 2010/0118839 | A1 | 5/2010 | Malladi et al. |
| 2010/0165882 | A1 | 7/2010 | Palanki et al. |
| 2010/0167743 | A1 | 7/2010 | Palanki et al. |
| 2010/0172310 | A1* | 7/2010 | Cheng et al. ............ 370/329 |
| 2010/0172311 | A1 | 7/2010 | Agrawal et al. |
| 2010/0182903 | A1 | 7/2010 | Palanki et al. |
| 2010/0260154 | A1 | 10/2010 | Frank et al. |
| 2010/0272094 | A1* | 10/2010 | Byard et al. ............ 370/350 |
| 2010/0311437 | A1 | 12/2010 | Palanki et al. |
| 2010/0317343 | A1 | 12/2010 | Krishnamurthy et al. |
| 2010/0323719 | A1 | 12/2010 | Jen |
| 2010/0331009 | A1 | 12/2010 | Krishnamurthy et al. |
| 2011/0039583 | A1 | 2/2011 | Frank et al. |
| 2011/0117925 | A1 | 5/2011 | Sampath et al. |
| 2011/0143770 | A1 | 6/2011 | Charbit et al. |
| 2011/0143773 | A1 | 6/2011 | Kangas et al. |
| 2011/0148700 | A1 | 6/2011 | Lasagabaster et al. |
| 2011/0149868 | A1 | 6/2011 | Krishnamurthy et al. |
| 2011/0149903 | A1 | 6/2011 | Krishnamurthy et al. |
| 2011/0158200 | A1 | 6/2011 | Bachu et al. |
| 2011/0176440 | A1 | 7/2011 | Frank et al. |
| 2011/0190016 | A1 | 8/2011 | Hamabe et al. |
| 2011/0205914 | A1 | 8/2011 | Krishnamurthy et al. |
| 2011/0244884 | A1 | 10/2011 | Kangas et al. |
| 2011/0268101 | A1 | 11/2011 | Wang et al. |
| 2011/0286349 | A1 | 11/2011 | Tee et al. |
| 2012/0002609 | A1 | 1/2012 | Larsson et al. |
| 2012/0021769 | A1 | 1/2012 | Lindoff et al. |
| 2012/0051445 | A1 | 3/2012 | Frank et al. |
| 2012/0122478 | A1 | 5/2012 | Siomina et al. |
| 2013/0273905 | A1 | 10/2013 | Krishnamurthy et al. |

FOREIGN PATENT DOCUMENTS

| | | |
|---|---|---|
| WO | 2008033117 A1 | 3/2008 |
| WO | 2008137354 A1 | 11/2008 |
| WO | 2008137607 A2 | 11/2008 |
| WO | 2010080845 A2 | 7/2010 |
| WO | 2010138039 A1 | 12/2010 |

OTHER PUBLICATIONS

3GPP TS 36.211 V8.6.0, Technical Specification Group Radio Access Network; E-UTRA; "Physical Channels and Modulation: (Release 8)", Mar. 2009;, 83 pages.

3GPP TS 36 211 v8.4.0 Technical Specification Group Radio Access Network; E-UTRA; Physical Channels and Modulation (Release 8); Sep. 2008, 78 pages.

3GPP TSG RAN WG1 #56bis, Ljubjana, Slovenia; Jan. 12-19, 2009, "On OTDOA in LTE", Qualcomm, R1-090353, 8 pages.

3GPP TSG RAN #42, Athens, Greece, Dec. 2-5, 2008, "Positioning Support for LTE", Article 39, 3GPP TR 21.900; RP-080995, 6 pages.

3GPP TSG RAN WG1 #56bis, Ljubjana, Slovenia; Jan. 12-16, 2009, "Improving the hearability of LTE Positioning Service", Alcatel-Lucent, R1-090053, 5 pages.

3GPP TSG RAN WG4 (Radio) #20, New Jersey, USA; Nov. 12-16, 2001, "UTRAN SFN-SFN observed time difference measurement & #GPP TS 25.311 IE 10.3.7.106 UE positioning OTDOA neighbour cell info' assistance data fields", Tdoc R4-011408, 4 pages.

John P. Costas, "A Study of a Class Detection Waveforms Having Nearly Ideal Range—Doppler Ambiguity Properties", Proc. IEEE, vol. 72, No. 8, Aug. 1984, pp. 996-1009.

Jiann-Ching Guey, "Synchronization Signal Design for OFDM Based on Time-Frequency Hopping Patterns", Proceedings of IEEE International Conference on Communications, 2007, pp. 4329-4334.

3GPP TSG RAN WG 1 #56 bis, Mar. 23-27, 2009, Seoul, South Korea; "Reference Signals for Low Interference Subframes in Downlink", Ericsson, R1-091314; 8 pages.

3GPP TSG RAN 1 #58 Aug. 24-28, 2009, Shenzhen, P.R. China, "Positioning Subframe Muting for OTDOA Measurements", Motorola, R1-093406; 9 pages.

3GPP TSG RAN WG1 #358, Aug. 24-28, 2009, "LS on assistance information for OTDOA positioning support for LTE", R1-093729, 3 pages.

3GPP TSG RAN WG1 #58, Athens, Greece; Feb. 9-13, 2009, "On OTDOA method for LTE Positioning", Ericsson, R1-090918, 6 pages.

3GPP TSG RAN WG1 #56, Feb. 9-13, 2009, Athens, Greece, "PHY Layer Specification Impact of Positioning Improvements", Qualcomm Europe, R1-090852, 3 pages.

3GPP TSG RAN WG1 #56bis, Mar. 23-27, 2009, "Further details on DL OTDOA", Ericsson, R1-091312, 6 pages.

3GPP TSG RAN WG1 #58, Aug. 24-28, 2009, Shenzhen, China, "Draft CR 36.211 Introduction of LTE Positioning", R1-093603, 5 pages.

3GPP TSG RAN WG1 #59, Nov. 9-13, 2009, Jeju, South Korea, Change Request 36.211, "Introduction of LTE positioning", Ericsson, R1-095027, 6 pages.

3GPP TSG RAN3 #68, May 10-14, 2010, Montreal, Canada, "Addition of PRS Muting Configuration Information to LPPa", Ericsson, R3-101526, 7 pages.

3GPP TSG RAN2 #70, May 10-14, 2010, Montreal, Canada, "Signalling support for PRS muting in OTDOA", Ericsson, ST-Ericsson, R2-103102, 2 pages.

3GPP TSG RAN WG4 #53, Nov. 9-13, 2009, Jeju, South Korea, "System simulation results for OTDOA", Ericsson, R4-094532, 3 pages.

(56) References Cited

OTHER PUBLICATIONS

3GPP TS 36.213 V9.0.0, Technical Specification Group Radio Access Network, E-UTRA, "Physical layer procedures (Release 9)", Dec. 2009, 79 pages.
3GPP TS 36.355 V9.0.0, Technical Specification Group Radio Access Network, E-UTRA, "LTE Positioning Protocol (LLP) (Release 9)", Dec. 2009, 102 pages.
3GPP TS RAN WG1 #58, Aug. 24-28, 2009, Shenzhen, China, "Draft CR 36.213 Introduction of LTE Positioning", R1-093604, 3 pages.
3GPP TSG RAN WG1 #59, Jeju, South Korea, Nov. 9-13, 2009, "Text proposal on Orthogonal PRS Transmissions in mixed CP deployments using MBSFN subframes", Motorola, R1-095003, 4 pages.
3GPP TSG RAN WG1 #59, Nov. 9-13, 2009, Jeju, South Korea, Change Request 36.214, "Introduction of LTE positioning", Ericsson, et al., R1-94430, 4 pages.
3GPP TSG RAN WG1 #58bis, Oct. 12-16, 2009, Miyazaki, Japan, Change Request 36.213, "Clarification of PDSCH and PRS in combination for LTE positioning", Ericsson, et al., R1-094262, 4 pages.
3GPP TSG RAN WG1 #59, Nov. 9-13, 2009, Jeju, South Korea, "Introduction of LTE Positioning", Ericsson et al., R1-094429, 5 pages.
3GPP TSG RAN WG1 #58, Aug. 24-28, 2009, Shenzhen, China, "Draft, CR 36.214 Introduction of LTE Positioning", R1-093605, 6 pages.
3GPP TS 36.211 V9.0.0, Technical Specification Group Radio Access network, E-UTRA, "Physical Channels and Modulation(Release9)", Dec. 2009, 85 pages.
3GPP TS 36.305, 3rd Generation Partnership Project; Technical Specification Group Radio Access Network; Evolved Universal Terrestrial Radio Access (E-UTRA); Stage 2 functional specification of User Equipment (UE) positioning in E-UTRAN (Release 9), May 2009.
Nortel; 3GPP TSG-RAN WG1 #57, Discussions on UE Positioning Issues; May 4-8, 2009, San Francisco, CA, USA, R1-091911, all pages.
Qualcomm Europe, Nokia Corporation, Nokia Siemens Networks, T-Mobile USA, Andrew Corporation; 3GPP TSG-RAN WG2, #66bis, Evaluation of Protocol Architecture Alternatives for Positioning, Jun. 29-Jul. 3, 2009; Los Angeles, CA USA, R2-93885, all pages.
3GPP TS 04.35; 3rd Generation Partnership Project; Technical Specification Group GSM EDGE Radio Access Network; Location Services (LCS); Broadcast Network Assistance for Enhanced Observed Time; Difference (E-OTD) and Global Positioning Methods (Release 1999), Jan. 2001, all pages.
3GPP TS 25.305; 3rd Generation Partnership Project;, Technical Specification Group Radio Access Network; Stage 2 function specification of User Equipment (UE) positioning in UTRAN (Release 8), Dec. 2008, all pages.
Motorola, "On Serving Cell Muting for OTDOA Measurements", 3GPP TSG RAN1 #57, R1-092628, Los Angeles, CA, USA, Jun. 29, 2009, all pages.
Motorola: "Positioning Subframe Muting for OTDOA Measurements", 3GPP TSG RAN1 #58, Shenzhen, P.R. China, Aug. 24, 2009, all pages.
The Organizational Partners: "3GPP TS 36.211", 3rd Generation Partnership Project; Technical Specification Group Radio Access Network; Evolved Universal Terrestrial Radio Access (E-UTRA), Physical Channels and Modulation (Release 8); Valbonne—France, Mar. 2009, all pages.
3GPP TSG RAN1 #56bis, R1-091336 "Study on hearability of reference signals in LTE positioning support" Motorola; Seoul, South Korea; Mar. 23-29, 2009; 8 pages.
United States Patent and Trademark Office, "Non-Final Rejection" for U.S. Appl. No. 12/756,777 dated Apr. 19, 2013, 18 pages.
Japanese Patent Office; Office Action for Japanese Patent Application No. 2012-503786 dated Apr. 2, 2013, 6 pages.
3GPP TSG RAN1 #56bis, R1-091336 "Study on hearability of reference signals in LTE positioning support" Motorola; Seoul, South Korea; Mar. 23-29 2009; 8 pages.
United States Patent and Trademark Office, "Non-Final Rejection" for Application No. 12/756,777 dated Apr. 19, 2013, 18 pages.
3GPP TSG-RAN WG1 #57, R1-091912 "Simulation results on UE positioning using positioning reference signals" Nortel; San Francisco, USA, May 4-8, 2009, 11 pages.
Patent Cooperation Treaty, "Search Report and Written Opinion" for International Application No. PCT/US2011/025607 Aug. 19, 2011, 21 pages.
United States Patent and Trademark Office, "Non-Final Rejection" for U.S. Appl. No. 12/813,221 dated Oct. 8, 2013, 11 pages.
United States Patent and Trademark Office, "Final Rejection" for U.S. Appl. No. 12/756,777 dated Nov. 1, 2013, 13 pages.
United States Patent and Trademark Office, "Non-Final Rejection" for U.S. Appl. No. 12/542,374 dated Aug. 7, 2013, 23 pages.
United States Patent and Trademark Office, "Non-Final Office Action" for U.S. Appl. No. 12/973,467 dated Mar. 28, 2013, 10 pages.

* cited by examiner

Figure 4a

Time →, Frequency ↓

| | t₀ | t₁ | t₂ | t₃ | t₄ | t₅ | t₆ | t₇ | t₈ | t₉ | t₁₀ | t₁₁ |
|---|---|---|---|---|---|---|---|---|---|---|---|---|
| sub₁₁ | 404 | 402 | X | X | X | X | 406 | X | X | X | X | X |
| sub₁₀ | 402 | 402 | X | X | X | X | X | 406 | X | X | X | X |
| sub₉ | 402 | 402 | 406 | X | X | X | X | X | 406 | X | X | X |
| sub₈ | 402 | 402 | X | 406 | X | X | X | X | X | 406 | X | X |
| sub₇ | 402 | 402 | X | X | 406 | X | X | X | X | X | 406 | X |
| sub₆ | 402 | 402 | X | X | X | 406 | X | X | X | X | X | 406 |
| sub₅ | 404 | 402 | X | X | X | X | 406 | X | X | X | X | X |
| sub₄ | 402 | 402 | X | X | X | X | X | 406 | X | X | X | X |
| sub₃ | 402 | 402 | 406 | X | X | X | X | X | 406 | X | X | X |
| sub₂ | 402 | 402 | X | 406 | X | X | X | X | X | 406 | X | X |
| sub₁ | 402 | 402 | X | X | 406 | X | X | X | X | X | 406 | X |
| sub₀ | 402 | 402 | X | X | X | 406 | X | X | X | X | X | 406 |

| | t₀ | t₁ | t₂ | t₃ | t₄ | t₅ | t₆ | t₇ | t₈ | t₉ | t₁₀ | t₁₁ |
|---|---|---|---|---|---|---|---|---|---|---|---|---|
| sub₁₁ | 402 | 402 | 406 | X | X | X | X | X | 406 | X | X | X |
| sub₁₀ | 402 | 402 | X | 406 | X | X | X | X | X | 406 | X | X |
| sub₉ | 404 | 402 | X | X | 406 | X | X | X | X | X | 406 | X |
| sub₈ | 402 | 402 | X | X | X | 406 | X | X | X | X | X | 406 |
| sub₇ | 402 | 402 | X | X | X | X | 406 | X | X | X | X | X |
| sub₆ | 402 | 402 | X | X | X | X | X | 406 | X | X | X | X |
| sub₅ | 404 | 402 | 406 | X | X | X | X | X | 406 | X | X | X |
| sub₄ | 402 | 402 | X | 406 | X | X | X | X | X | 406 | X | X |
| sub₃ | 404 | 402 | X | X | 406 | X | X | X | X | X | 406 | X |
| sub₂ | 402 | 402 | X | X | X | 406 | X | X | X | X | X | 406 |
| sub₁ | 402 | 402 | X | X | X | X | 406 | X | X | X | X | X |
| sub₀ | 402 | 402 | X | X | X | X | X | 406 | X | X | X | X |

| Header 502 | Time 504 | Offset 506 | Network Muting 508 | PCID List 510 |
|---|---|---|---|---|

500
Figure 5

| Header 602 | Time 604 | Offset 606 | Network Muting 608 | PCID List 610 | | |
|---|---|---|---|---|---|---|
| | | | | Station Muting 612 / PCID 614 | Station Muting 612 / PCID 614 | Station Muting 612 / PCID 614 |

AUTONOMOUS MUTING INDICATION TO ENABLE IMPROVED TIME DIFFERENCE OF ARRIVAL MEASUREMENTS

CROSS REFERENCE TO RELATED APPLICATION

This application is a continuation of U.S. patent application Ser. No. 12/573,456 entitled "Muting Indication to Enable Improved Time Difference of Arrival Measurements" by Colin Frank et al. filed on Oct. 5, 2009.

TECHNICAL FIELD

The present disclosure relates to a method and system for locating a user communication device in a coordinated network. The present disclosure further relates to efficiently mitigating interference from the serving cell when determining the position of the user communication device.

BACKGROUND

The Third Generation Partnership Project (3GPP) is developing a Long Term Evolution (LTE) standard using a physical layer based on globally applicable evolved universal terrestrial radio access (E-UTRA). In release-8 specification of LTE, an LTE base station, referred to as an enhanced Node-B (eNB), may use an array of four antennas to broadcast a signal to a piece of user equipment.

A user communication device, or user equipment (UE) device, may rely on a pilot or reference symbol (RS) sent from the transmitter for channel estimation, subsequent data demodulation, and link quality measurement for reporting. Further, the UE device may rely on a positioning reference symbol (PRS) to determine an observed time difference of arrival (OTDOA) of the PRS from one or more network base stations. The UE device may send the OTDOA to the network. The network may use that data to calculate the position of the UE device within the network by calculating the distance of the UE device from the network base stations of the network and triangulating the position of the UE device.

BRIEF DESCRIPTION OF THE DRAWINGS

Understanding that these drawings depict only typical embodiments of the disclosure and are not therefore to be considered to be limiting of its scope, the disclosure will be described and explained with additional specificity and detail through the use of the accompanying drawings in which:

FIGS. 4a-b illustrate, in a block diagram, different embodiments of a resource block of a positioning subframe.

FIG. 5 illustrates, in a block diagram, one embodiment of a system information block.

FIG. 6 illustrates, in a block diagram, one embodiment of a positioning assistance data set provided via radio resource control signaling.

DETAILED DESCRIPTION

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments are discussed in detail below. While specific implementations are discussed, it should be understood that this is done for illustration purposes only. A person skilled in the relevant art will recognize that other components and configurations may be used without parting from the spirit and scope of the disclosure.

The present disclosure comprises a variety of embodiments, such as a method, a user communication device, and a network base station, and other embodiments that relate to the basic concepts of the disclosure. The user communication device may be any manner of computer, mobile device, or wireless communication device.

A method, a user communication device, and a base station are disclosed. A transceiver may receive a serving transmission from a serving base station. A processor may make a status determination of an autonomous muting status of a neighbor base station based on the serving transmission.

Figure 1:
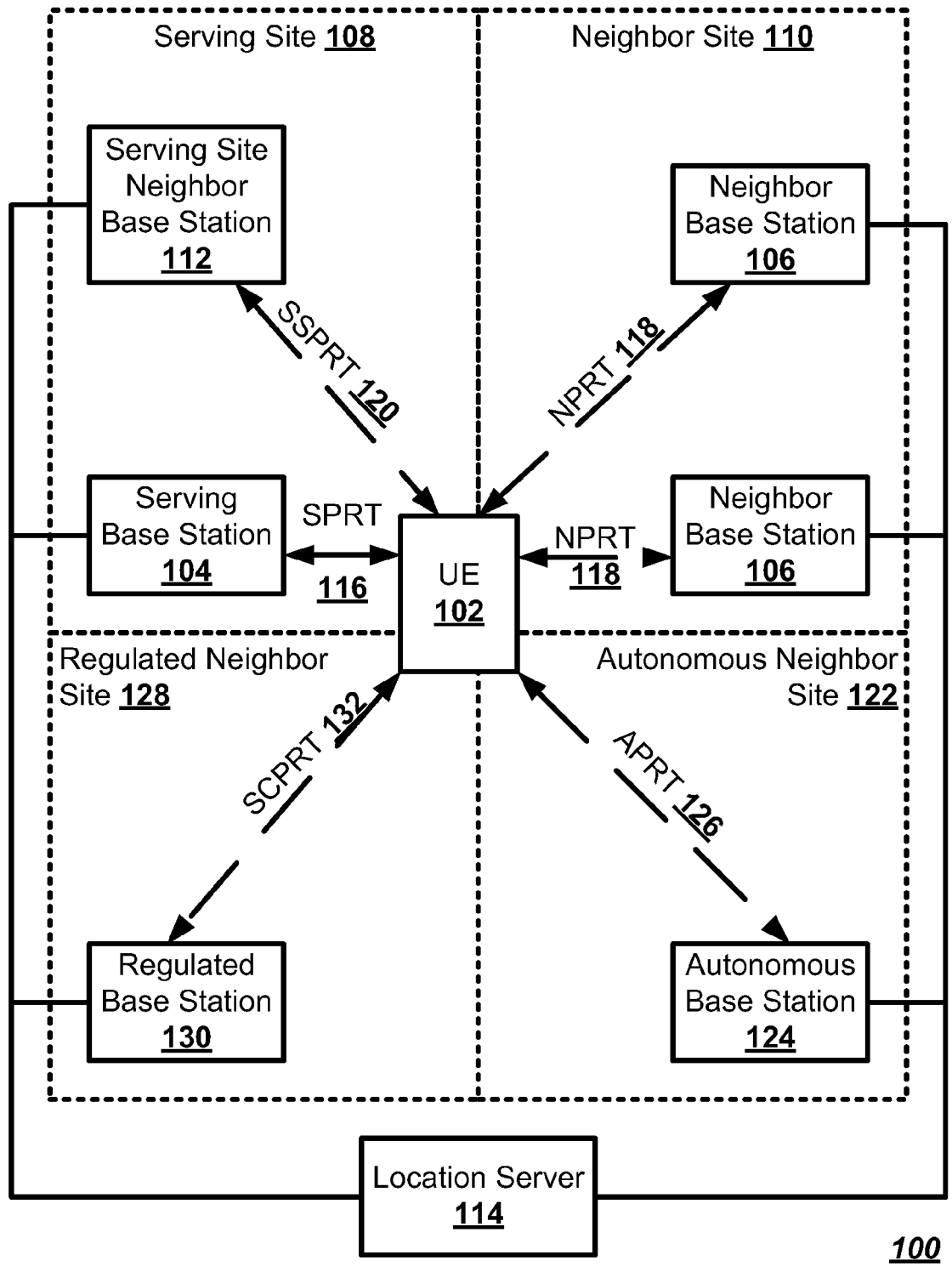
FIG. 1 illustrates in a block diagram one embodiment of a communication system.

FIG. 1 illustrates one embodiment of a communication network 100. While a Long Term Evolution (LTE) carrier communication system 100, as defined by the Third Generation Partnership Project (3GPP®) is disclosed, other types of communication systems may use the present disclosure. Various communication devices may exchange data or information through the network 100. The network 100 may be an evolved universal terrestrial radio access (E-UTRA), or other type of telecommunication network.

A LTE user equipment (UE) device 102, or user communication device, may access the coordinated communication network 100 via any one of a number of LTE network base stations, or enhance Node Bs (eNB), that support the network. For one embodiment, the UE device 102 may be one of several types of handheld or mobile devices, such as, a mobile phone, a laptop, or a personal digital assistant (PDA). For one embodiment, the UE device 102 may be a WiFi® capable device, a WiMAX® capable device, or other wireless devices.

The primary network base station currently connecting the UE device 102 to the coordinated communications network may be referred to as a serving base station 104. The UE device 102 may receive signals from other network base stations proximate to the serving base station 104, referred to herein as a neighbor base station 106.

A cellular site may have multiple base stations. A cellular site having the serving base station 104 may be referred to herein as the serving site 108. A cellular site that does not have the serving base station 104 may be referred to herein as the neighbor site 110. A serving site 108 may also have one or more neighbor base stations in addition to the serving network base station 108, referred to herein as a serving site neighbor base station 112.

The coordinated communication network 100 may use a location server 114 to triangulate the network location of the UE device 102 within the coordinated communication network 100. Alternatively, one of the base stations may act as a location server 114. Each base station may broadcast a positioning reference transmission to be received by the UE device 102. The location server 114 may use the positioning reference transmission to determine the location of the UE device 102 within the network 100. Alternately, the UE device 102 or the serving base station 104 may use the positioning reference transmission to determine the location. The positioning reference transmission may be a set of one or more positioning reference symbols (PRS) of various values arranged in a pattern unique to the base station sending the positioning reference transmission.

The positioning reference transmission from the serving base station 104 may be referred to herein as the serving positioning reference transmission (SPRT) 116. The positioning reference transmission from the neighbor base station 106 may be referred to herein as the neighbor positioning reference transmission (NPRT) 118. The positioning reference transmission from the serving site neighbor base station 112 may be referred to herein as a same site positioning reference transmission (SSPRT) 120. The UE device 102 may measure the observed time difference of arrival (OTDOA) for each NPRT 118, to determine the distance between the UE device 102 and each observed neighbor base station 106.

Figure 2:
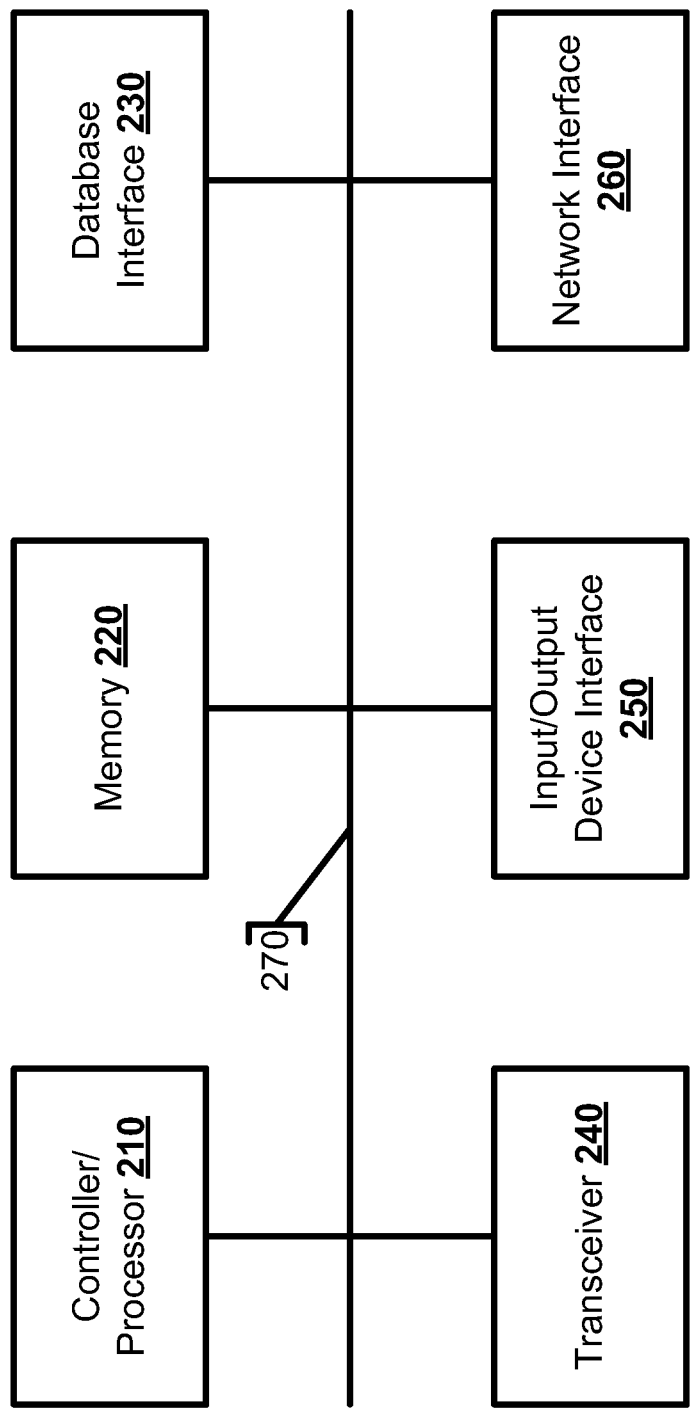
FIG. 2 illustrates a possible configuration of a computing system to act as a base transceiver station.

FIG. 2 illustrates a possible configuration of a computing system 200 to act as a network operator server 106 or a home network base station 110. The computing system 200 may include a controller/processor 210, a memory 220, a database interface 230, a transceiver 240, input/output (I/O) device interface 250, and a network interface 260, connected through bus 270. The network server 200 may implement any operating system. Client and server software may be written in any programming language, such as C, C++, Java or Visual Basic, for example. The server software may run on an application framework, such as, for example, a Java® server or .NET® framework The controller/processor 210 may be any programmed processor known to one of skill in the art. However, the method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the method as described herein may be used to implement the system functions of this disclosure.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM), digital video disc-read only memory (DVD-ROM), DVD read write input, tape drive, or other removable memory device that allows media content to be directly uploaded into the system.

Data may be stored in the memory or in a separate database. The database interface 230 may be used by the controller/processor 210 to access the database. The database may contain a subscriber information set for each UE device 102 that may access the network 100, as well as a physical cell identifier (PCID) for the base station.

The transceiver 240 may create a connection with the mobile device 104. The transceiver 240 may be incorporated into a base station 200 or may be a separate device.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network. The network connection interface 260 may be used to connect a client device to a network. The network interface 260 may connect the home network base station 110 to a mobility management entity of the network operator server 106. The components of the network server 200 may be connected via an electrical bus 270, for example, or linked wirelessly.

Client software and databases may be accessed by the controller/processor 210 from memory 220, and may include, for example, database applications, word processing applications, as well as components that embody the functionality of the present disclosure. The network server 200 may implement any operating system. Client and server software may be written in any programming language. Although not required, the disclosure is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
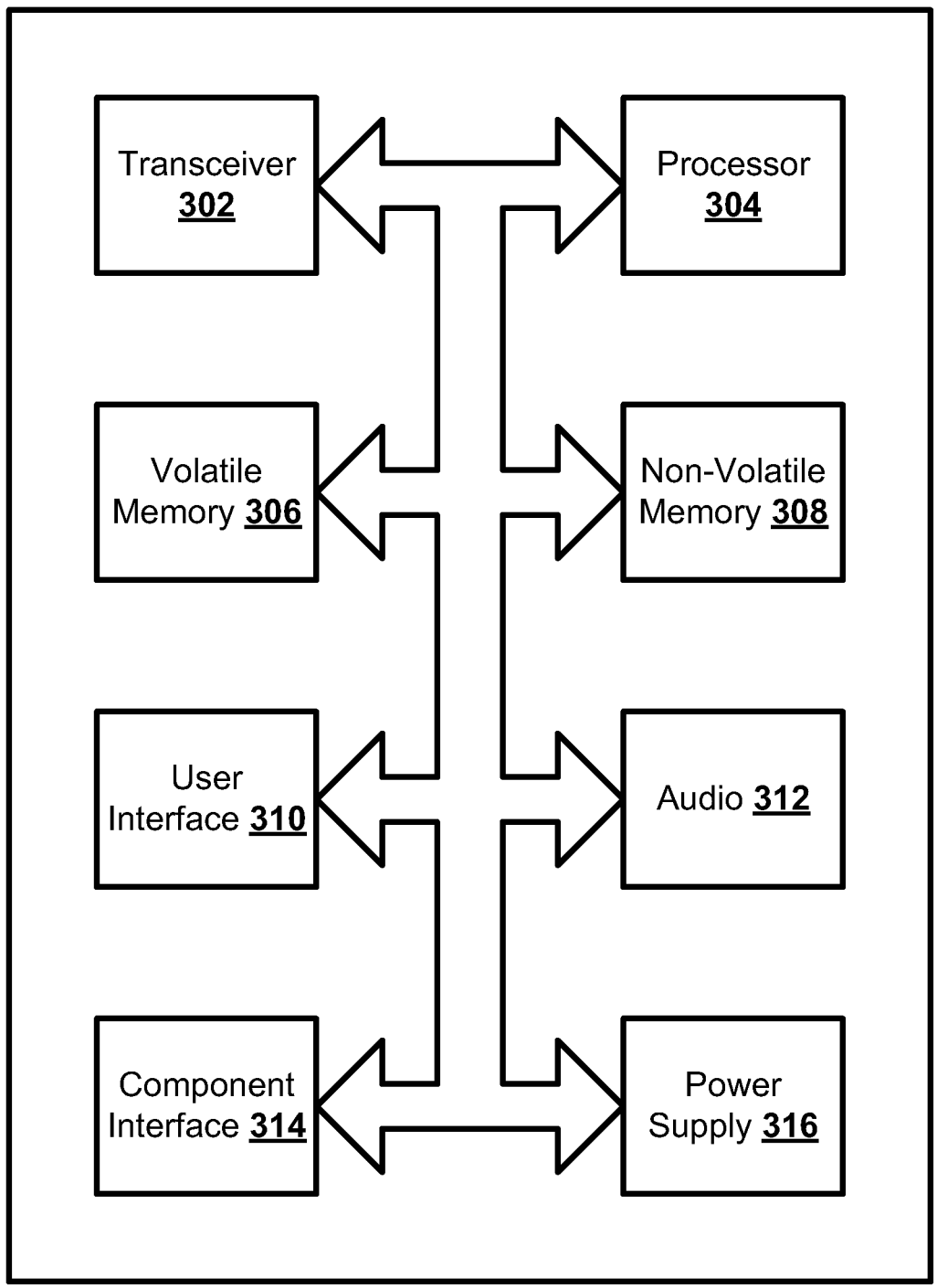
FIG. 3 illustrates, in a block diagram, one embodiment of a mobile system or electronic device to create a radio connection.

FIG. 3 illustrates one embodiment of a mobile device 300, capable of acting as a UE device 102 or user communication device. For some embodiments of the present disclosure, the mobile device 300 may also support one or more applications for performing various communications with a network. The mobile device 300 may be a handheld device, such as, a mobile phone, a laptop, or a personal digital assistant (PDA). For some embodiments of the present disclosure, the user device 300 may be WiFi® capable device, which may be used to access the network mobile for data or by voice using VOIP.

The mobile device 300 may include a transceiver 302, which is capable of sending and receiving data over the mobile network 102. The mobile device 300 may include a processor 304 that executes stored programs. The mobile device 300 may also include a volatile memory 306 and a non-volatile memory 308 to act as data storage for the processor 304. The mobile device 300 may include a user input interface 310 that may comprise elements such as a keypad, display, touch screen, and the like. The mobile device 300 may also include a user output device that may comprise a display screen and an audio interface 312 that may comprise elements such as a microphone, earphone, and speaker. The mobile device 300 also may include a component interface 314 to which additional elements may be attached, for example, a universal serial bus (USB) interface. Finally, the mobile device 300 may include a power supply 316.

In order to determine the position of the UE device 102 within the coordinated communication network 100, the UE device 102 may make time-difference-of-arrival measurements on the neighboring network base stations 106. The UE device 102 may use positioning subframes and positioning reference symbols to better "hear" neighbor base stations 106.

As each base station sends a different positioning reference transmission, the positioning reference symbols may become interlaced in the frequency domain. Each base station may apply one of a set of frequency offsets, for example a set of six frequency offsets, to better distinguish between the base stations. As a coordinated communication network 100 may have more base stations than frequency offsets, multiple base stations may be assigned the same offset. For example, if the network 100 has eighteen base stations and uses six frequency offsets, each frequency offset may be assigned to three base stations.

Depending on the bandwidth of the system, the positioning subframe may contain any number of resource blocks, such as six to one hundred resource blocks. The resource block may have, for example, twelve to fourteen symbols and twelve subcarriers. For a largest bandwidth of 20 MHz, the positioning subframe may have, for example, one hundred resource blocks, and thus 1200 subcarriers per subframe. The resource blocks may be stacked in frequency. Thus, for every symbol within the subframe, the subframe may have, for example, 1200 subcarriers.

A set of diagonal PRS patterns may be defined for use in the positioning subframes. The patterns may be frequency offsets of a base diagonal pattern with the cell-specific frequency shift given by $v_{shift} = N_{Cell}^{ID} \mod 6$.

Different resource blocks may represent different base stations. FIG. 4a may illustrate, in a block diagram, one embodiment of a resource block 400 from a first base station, while FIG. 4b may illustrate, in a block diagram, one embodiment of a resource block 410 from a second base station. The positioning subframe may have both a time component and a frequency component. Each resource block 400 may begin with a set of control region symbols 402. The resource block 400 may have a common reference symbol representing an antenna port. One or more positioning reference symbols 406 may be encoded in the positioning subframe in a pattern. A UE device may use both the pattern and the values of the positioning reference symbols 406 to identify the originating base station.

Even with the inclusion of positioning reference symbols 406, a UE device 102 near a serving base station 104 may have significant difficulty in measuring the OTDOA of a neighbor base station 106 for multiple reasons. One reason may be the adaptive gain control or analog to digital converter limitations in the receiver. If the UE device is near the serving base station 104, the power of the serving base station 104 may far exceed that of the neighbor base station to be measured. As a result of these dynamic range limitations in the UE device 102, the UE device 102 may not be able to take measurements on a sufficient number of neighbor base stations 106 to enable an accurate position fix.

A second reason may be the misalignment of the positioning reference symbol (PRS) pattern. The PRS patterns may be orthogonal in the frequency domain. However, if two base stations are assigned orthogonal PRS patterns, the orthogonal nature of the corresponding positioning reference transmission signals received by the UE device 102 may depend on the positioning reference transmission signals being properly aligned as observed by the UE device 102. The positioning reference transmission signals may be considered properly aligned if the sum of the OTDOA and the channel delay spread do not exceed the cyclic prefix. Otherwise, the positioning reference transmission signals received by the UE device 102 may not be orthogonal even if the PRS patterns are. If a neighbor base station 106 is assigned a different pattern than the serving base station 104, the UE device 102 may make an OTDOA measurement on the neighbor base station 106 without interference from the serving base station 104, assuming no adaptive gain control or analog to digital converter limitations. However, if the sum of the OTDOA and the channel delay spread exceed the channel cyclic prefix, the OTDOA measurements may be contaminated with interference from the serving base station, which may be very strong when the UE device 102 is near the serving base station 104.

In a partially synchronous network, the positioning subframes from different base stations may be offset by as much as one-half a subframe or more, resulting in misalignment of the symbol boundaries. Thus, the PRS patterns which are orthogonal in the frequency domain when the positioning subframes are time aligned may no longer be orthogonal, regardless of the channel delay-spread or the OTDOA of the serving base station 104 and the neighbor base stations 106.

One solution to the above problems is to sometimes mute the serving base station 104 in order to enable the UE device 102 to take accurate OTDOA measurements on a sufficient number of neighbor base stations 106 when the UE device 102 is near the serving base station 104.

The base station may transmit the positioning reference transmission with zero power in certain positioning subframes, or mute certain positioning subframes. However, the UE device 102 may currently be unaware of whether or not a particular base station has muted its positioning reference transmission, leading to problems when the positioning reference transmission from a neighbour base station 106 is sufficiently weak to prevent a reliable determination of whether or not the positioning reference transmission were transmitted by a particular base station, and thus whether or not the OTDOA measurement for the base station is valid.

A base station may perform this muting of the position reference transmission autonomously. Referring back to FIG. 1, a neighbor site 110 that allows one of its base stations to autonomously mute the position reference transmission may be referred to herein as an autonomous neighbor site 122. A base station on an autonomous neighbor site 122 may be referred to as an autonomous base station 124. The position reference transmission sent by the autonomous base station 124 may be referred to as an autonomous position reference transmission (APRT) 126. Similarly, a scheduled neighbor site 128 may forgo muting or may mute the position reference transmission following a scheduled pattern known to the UE device 102. A base station on a scheduled neighbor site 128 may be referred to as a scheduled base station 130. The position reference transmission sent by the scheduled base station 130 may be referred to as a scheduled position reference transmission (SCPRT) 132.

The serving base station 104 may explicitly alert the UE device 102 that the serving base station 104 or other base stations in the mobile network may perform autonomous muting. Thus, the UE device 102 may know in advance to perform a muting threshold test to distinguish between an actual position reference transmission and noise. The serving base station 104 may send an autonomous muting status indication in a system information block (SIB) or in a position assistance data set of a radio resource control signal. The autonomous muting status indication may be a network autonomous muting status indication that references an entire mobile network or sub-network. Additionally, the autonomous muting status indication may be a station autonomous muting status indication that references just the neighbor base station.

FIG. 5 illustrates, in a block diagram, one embodiment of a SIB 500. The serving base station 104 may send the SIB 500 to the UE device 102 so that the UE device 102 may properly interpret the positioning data. The SIB 500 may have a header 502 identifying the SIB 500. The SIB 500 may have a transmission time 504 for the set of positioning subframes. The SIB 500 may have a neighbor station search offset 506, giving the UE device 102 a window to search for neighbor base stations 106. The SIB 500 may have a network autonomous muting status indication 508 that alerts the UE device 102 that a base station in the mobile network may autonomously control its own muting. In some instances, the SIB 500 may contain a list 510 of PCIDs of neighbor base stations 106 for which OTDOA may be taken.

FIG. 6 illustrates, in a block diagram, one embodiment of a positioning assistance data set 600 for a radio resource control signal. The serving base station 104 may send the positioning assistance data set 600 to the UE device 102 so that the UE device 102 may properly interpret the positioning data. The positioning assistance data set 600 may have a header 602 identifying the positioning assistance data set 600. The positioning assistance data set 600 may have a transmission time 604 for the set of positioning subframes. The positioning assistance data set 600 may have a neighbor station search offset 606. The positioning assistance data set 600 may have a network autonomous muting status indication 608 that alerts the UE device 102 that a base station in the mobile network may autonomously control its own muting. In some instances, the positioning assistance data set 600 may contain a list 610 of PCIDs of neighbor base stations 106 for which OTDOA may be taken. The PCID list 610 may further contain an individual station autonomous muting status indication 612 paired with each PCID 614 representing each neighbor base station 106 that has an autonomous muting status that differs from the overall network.

The UE device 102 may make a status determination of an autonomous muting status of a neighbor base station 106 based on the serving transmission, even if no affirmative autonomous muting status indication is encoded in the serving transmission. Generally, a synchronous network may not allow autonomous muting and an asynchronous network may allow autonomous muting. The UE device may infer from a small neighbor station search offset that a mobile network is a synchronous network, while a large neighbor station search offset may indicate an asynchronous network.

Figure 7:
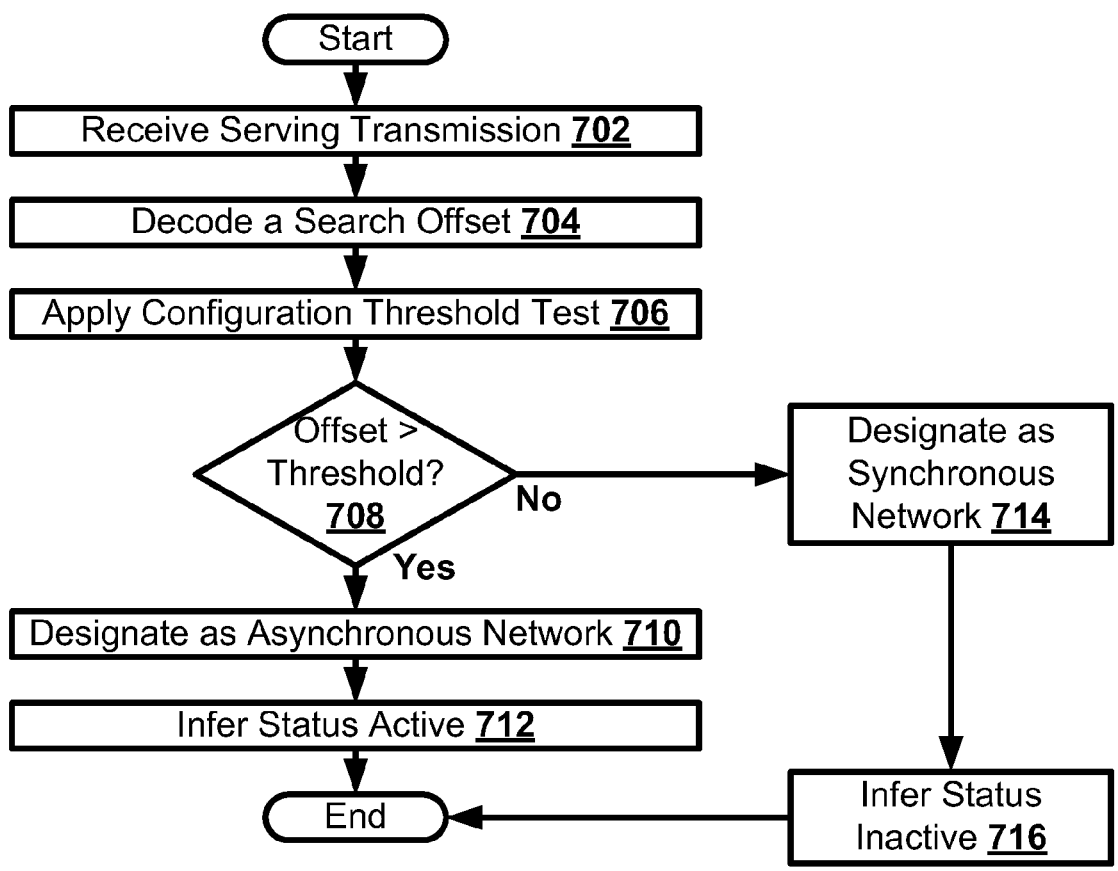
FIG. 7 illustrates, in a flowchart, one embodiment of a method for inferring the autonomous muting status of a neighbor base station.

FIG. 7 illustrates one embodiment of a method 700 for inferring the autonomous muting status of a neighbor base station. The UE device 102 may receive a serving transmission from a serving base station 104 (Block 702). The UE device 102 may decode a neighbor station search offset from the serving transmission (Block 704). The UE device 102 may apply a configuration threshold test to the neighbor base station search offset to make a configuration determination of whether the mobile network is a synchronous network or an asynchronous network (Block 706). If the search offset is greater than the configuration threshold (Block 708), then the UE device 102 may designate the mobile network 100 as an asynchronous network (Block 710). The UE device may infer that the autonomous muting status is active for the neighbor base station 106 (Block 712). Thus the neighbor base station 106 may autonomously control its own muting. If the search offset is not greater than the configuration threshold (Block 708), then the UE device 102 may designate the mobile network 100 as an synchronous network (Block 714). The UE device may infer that the autonomous muting status is inactive for the neighbor base station 106 (Block 712). Thus the location server or a network operator may control the muting of the neighbor base station 106.

Figure 8:
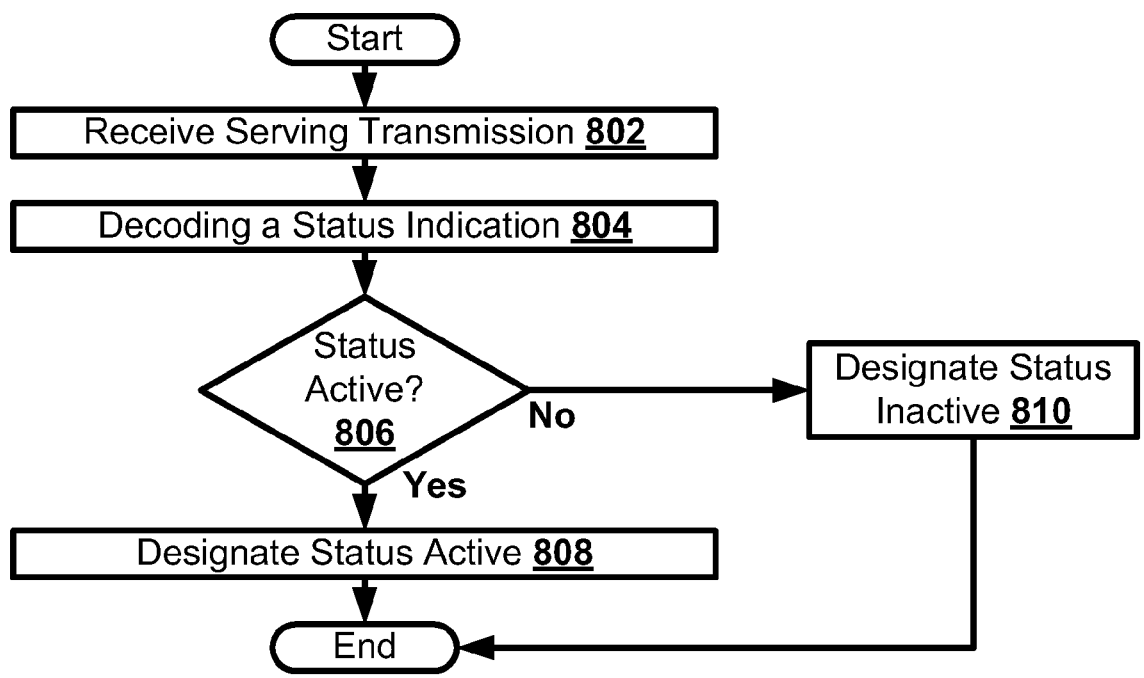
FIG. 8 illustrates, in a flowchart, one embodiment of a method for receiving an autonomous muting status indication.

FIG. 8 illustrates one embodiment of a method 800 for receiving an autonomous muting status indication. The UE device 102 may receive a serving transmission from a serving base station 104 (Block 802). The UE device 102 may decode an autonomous muting status indication from the serving transmission (Block 804). The autonomous muting status indication may be a network autonomous muting status indication or a station autonomous muting status indication. If the autonomous muting status indication labels the status as active (Block 806), then the UE device 102 may designate the autonomous muting status as active for the neighbor base station 106 (Block 808). If the autonomous muting status indication labels the status as inactive (Block 806), then the UE device 102 may designate the autonomous muting status as inactive for the neighbor base station 106 (Block 810).

Figure 9:
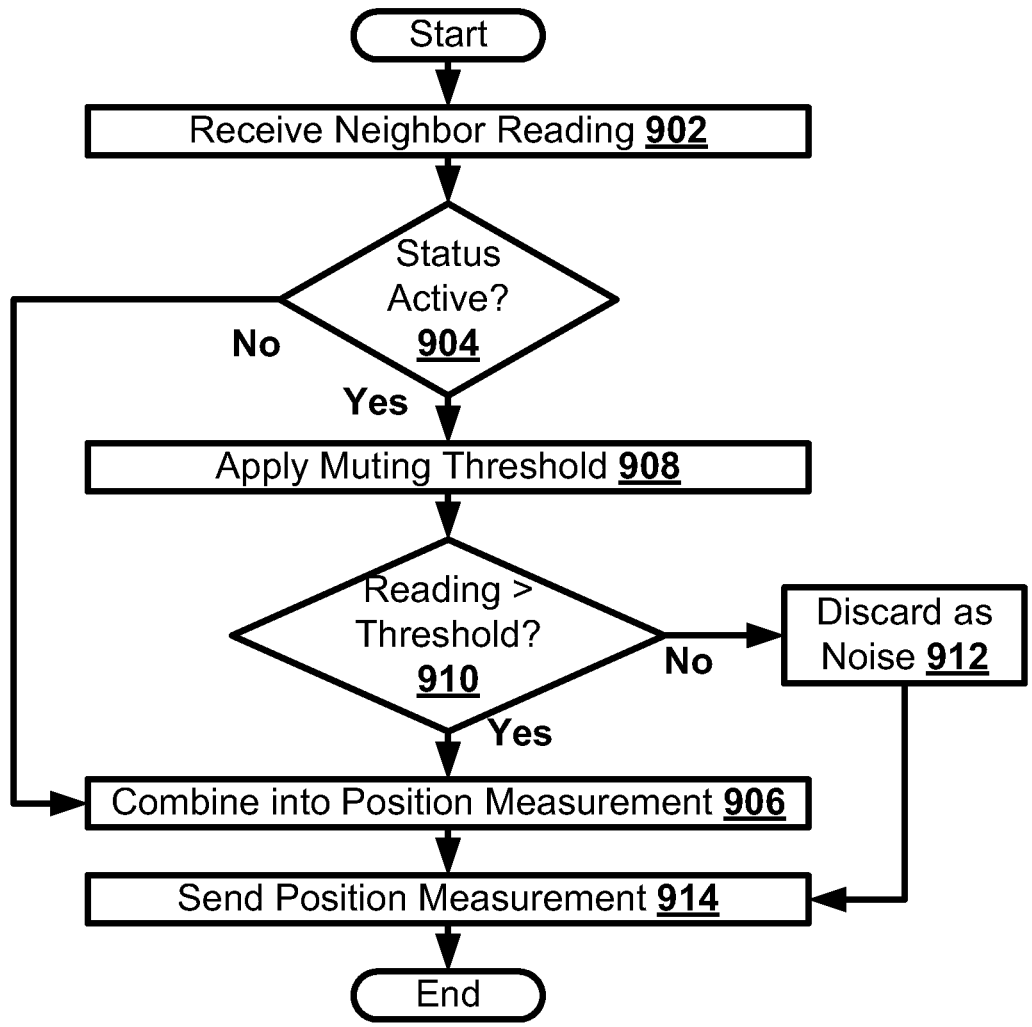
FIG. 9 illustrates, in a flowchart, one embodiment of a method for making a combination time distance of arrival measurement.

Once the UE device 102 has determined the autonomous muting status for a neighbor base station 106, the UE device 102 may take a neighbor base station status reading for purposes of determining position within the network. FIG. 9 illustrates one embodiment of a method 900 for making a combination time distance of arrival measurement. The UE device 102 may receive a neighbor base station reading (Block 902). If the autonomous muting status is inactive (Block 904), then the UE device 102 may combine the neighbor base station reading into a position measurement (Block 906). If the autonomous muting status is active (Block 904), then the UE device 102 may apply a muting threshold test to the neighbor base station reading (Block 908). If the neighbor base station reading does not exceed a muting threshold (Block 910), then the UE device 102 may discard the neighbor base station reading as noise (Block 912). If the neighbor base station reading exceeds a muting threshold (Block 910), then the UE device 102 may combine the neighbor base station reading into a position measurement (Block 906). The UE device 102 may send the position measurement to the serving base station 104 (Block 914). Alternatively, the UE device 102 may forward a neighbor base station reading that exceeds the muting threshold to the serving base station 104. The serving base station 104 may combine the neighbor base station reading into a position measurement or forward the neighbor base station reading to the location server 114.

Figure 10:
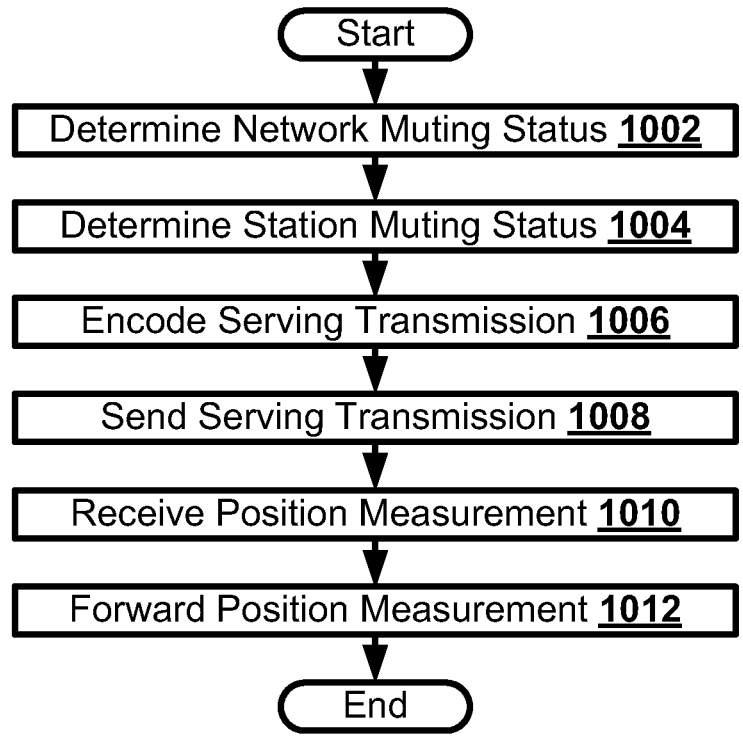
FIG. 10 illustrates, in a flowchart, one embodiment of a method for indicating autonomous muting status to a user communication device.

FIG. 10 illustrates one embodiment of a method 1000 for indicating autonomous muting status to a user communication device 102. The serving base station 104 may determine the muting status of the mobile network (Block 1002). The serving base 104 station may determine any anomalous station muting statuses that may affect positioning readings (Block 1004). The serving base station 104 may encode the serving transmission with the network autonomous muting status indication and the station autonomous muting status indication (Block 1006). The serving station 104 may send the serving transmission to the UE device 102 (Block 1008). The serving station 104 may receive a position measurement from the UE device 102 (Block 1010). The serving base station 104 may forward the position measurement on to the location server 114 (Block 1012). Alternatively, the serving base station 104 may receive a neighbor base station reading from the UE device. The serving base station 104 may combine the neighbor base station reading into a position measurement or forward the neighbor base station reading to the location server 114.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the disclosure, rather than any specific examples given.

We claim:

1. A method for measuring a time difference of arrival measurement in a mobile device, comprising:
   receiving a muting status indication in a position assistance data from a serving base station, wherein the position assistance data includes at least a physical cell identifier corresponding to a neighbor base station, a muting status applicable to a positioning reference signal transmission from the neighbor base station, and a neighbor cell search offset applicable to a positioning reference signal transmission from the neighbor base station;
   making a status determination of a muting status of a neighbor base station, where the status determination includes inferring that the muting status is inactive based on the received muting status indication;
   receiving a positioning reference signal transmitted from the neighbor base station; and
   determining a time difference of arrival of the neighbor base station transmission based on the received positioning reference signal and based on the muting status.

2. An apparatus for measuring a time difference of arrival measurement in a mobile equipment, comprising:
   a receiver that receives a muting status indication in a positioning assistance data from a serving base station, wherein the positioning assistance data includes at least a physical cell identifier corresponding to a neighbor base station, a muting status applicable to a positioning reference signal transmission from the neighbor base station, and a neighbor cell search offset applicable to a positioning reference signal transmission from the neighbor base station; and
   a processor coupled to the receiver, the processor configured to make a status determination of a muting status of a neighbor base station, where the status determination includes inferring that the muting status is inactive based on the received muting status indication,
   wherein the receiver is further configured to receive a positioning reference signal transmitted from the neighbor base station; and
   wherein the processor is further configured to determine a time difference of arrival of the neighbor base station transmission based on the received positioning reference signal and the muting status.

* * * * *